United States Patent
Hamanaka

[19]

[11] Patent Number: 6,031,591

[45] Date of Patent: Feb. 29, 2000

[54] LIQUID-CRYSTAL DISPLAY DEVICE

[75] Inventor: Kenjiro Hamanaka, Kanagawa, Japan

[73] Assignee: Nippon Sheet Glass Co., Ltd., Osaka, Japan

[21] Appl. No.: 09/249,196

[22] Filed: Feb. 12, 1999

[30] Foreign Application Priority Data

Feb. 16, 1998 [JP] Japan ................................. 10-032651

[51] Int. Cl.$^7$ ................................................. G02F 1/1335
[52] U.S. Cl. .......................... 349/95; 349/122; 349/137; 349/158
[58] Field of Search ................................. 349/58, 95, 122, 349/137, 158, 162; 359/619; 345/32

[56] References Cited

U.S. PATENT DOCUMENTS

| | | | |
|---|---|---|---|
| 5,056,912 | 10/1991 | Hamada et al. ........................ | 349/95 |
| 5,508,834 | 4/1996 | Yamada et al. ......................... | 349/95 |
| 5,680,186 | 10/1997 | Watanabe et al. ...................... | 349/95 |

*Primary Examiner*—William L. Sikes
*Assistant Examiner*—Tai V. Duong
*Attorney, Agent, or Firm*—Pillsbury Madison & Sutro LLP

[57] ABSTRACT

A liquid-crystal display device has a planar microlens array and a liquid-crystal display panel coupled with the planar microlens array. The planar microlens array comprises an array of convex microlenses provided on a surface of a base glass plate. The array of convex microlenses is made of an ultraviolet-curable synthetic resin having a relatively high refractive index. A cover glass plate is joined to the liquid-crystal display panel and has a peripheral edge bonded to a peripheral edge of the array of convex microlenses. The cover glass plate is spaced from the array of convex microlenses by a hermetically sealed space which is filled with an inactive gas such as dry nitrogen gas, argon gas, or the like. The surfaces of the convex microlenses may be coated with an anti-oxidation film.

13 Claims, 5 Drawing Sheets

LIQUID-CRYSTAL DISPLAY DEVICE

BACKGROUND OF THE INVENTION

1. Field of the Invention

The present invention relates to a liquid-crystal display device comprising a planar microlens array and a liquid-crystal display panel which are combined with each other.

2. Description of the Related Art

FIG. 1 of the accompanying drawings shows a conventional liquid-crystal display device which comprises a planar microlens array 100 and a liquid-crystal display panel 200 which are combined with each other. As shown in FIG. 1, the planar microlens array 100 has a base glass plate 101, an array of convex microlenses 102 disposed on a surface of the base glass plate 101, and a cover glass plate 103 bonded to the array of convex microlenses 102 by an adhesive layer 104. The liquid-crystal display panel 200 has a glass substrate 201 spaced from the cover glass plate 103 by a spacer 201a, with a liquid crystal layer 202 filled between the cover glass plate 103 and the glass substrate 201. The glass substrate 201 supports transparent pixel electrodes 203 on its surface facing the liquid crystal layer 202. The surface of the glass substrate 201 includes portions 204 that are free of the transparent pixel electrodes 203 and carry interconnections and TFTs (Thin Film Transistors) which do not transmit incident light. Electrodes 205 which confront the transparent pixel electrodes 203 are mounted on a surface of the over glass plate 103 that faces the liquid crystal layer 202.

The adhesive layer 104 which is filled between the array of convex microlenses 102 and the cover glass plate 103 needs to be made of a material, i.e., a synthetic resin, having a refractive index that is sufficiently smaller than the refractive index of the material, i.e., a synthetic resin, of which the array of convex microlenses 102 is made.

However, synthetic resins which are presently available in the art for use as the material of the adhesive layer 104 do not have sufficiently low refractive indexes, leaving much to be improved with respect to the numerical aperture of the array of convex microlenses 102.

This problem will be illustrated below in reference to the fabrication of a lens that is required to have a certain numerical aperture. If the difference between the refractive index of the lens and the refractive index of a material held in contact with a curved surface of the lens is too small, then it is necessary to reduce the radius of curvature of the lens surface, making the lens shape closer to a hemispherical shape in order to attain the desired numerical aperture. However, the reduced radius of curvature of the lens surface results in an increased spherical aberration. With the increased spherical aberration, the lens tends to focus applied light into a larger light spot.

SUMMARY OF THE INVENTION

It is an object of the present invention to provide a liquid-crystal display device including a planar microlens array which has a relatively large numerical aperture and hence a relatively small spherical aberration.

According to the present invention, there is provided a liquid-crystal display device comprising a planar microlens array and a liquid-crystal display panel coupled with the planar microlens array. The planar microlens array comprises a base glass plate, an array of convex microlenses mounted on a surface of the base glass plate, and a cover glass plate joined to the liquid-crystal display panel having a peripheral edge bonded to a peripheral edge of the array of convex microlenses. The cover glass plate is spaced from the array of convex microlenses by a hermetically sealed space.

The hermetically sealed space present between the array of convex microlenses and the cover glass plate is effective to provide a greater refractive index difference with respect to the material of the array of convex microlenses than with the adhesive layer which has conventionally been held in contact with the array of convex microlenses to bond the cover glass plate to the array of convex microlenses. Accordingly, the array of convex microlenses has a relatively large numerical aperture and hence a relatively small spherical aberration.

If the hermetically sealed space were filled with air, the surfaces of the convex microlenses, which are typically made of a synthetic resin, would tend to be undesirably oxidized and discolored. To prevent the convex microlenses from being unduly oxidized and discolored, the hermetically sealed space may be filled with an inactive gas such as dry nitrogen gas, argon gas, or the like. The convex microlenses may be coated with an anti-oxidation film.

The anti-oxidation film may double as an anti-reflection film. The anti-oxidation film may comprise a single-layer film of silica, a single-layer film of titanium dioxide, or a multiple-layer film of silica and titanium dioxide.

The surface of the cover glass plate facing the array of convex microlenses across the hermetically sealed space may be coated with an anti-oxidation film.

The surface of the base glass plate facing away from the array of convex microlenses may be coated with an anti-oxidation film.

The liquid-crystal display panel may comprise a glass substrate spaced from the cover glass plate, and a liquid crystal layer filled between the glass substrate and the cover glass plate. The surface of the glass substrate facing away from the liquid crystal layer may be coated with an anti-oxidation film.

The above and other objects, features, and advantages of the present invention will become more apparent from the following description when read in conjunction with the accompanying drawings in which preferred embodiments of the present invention are shown by way of illustrative example.

DETAILED DESCRIPTION OF THE PREFERRED EMBODIMENTS

Figure 1:
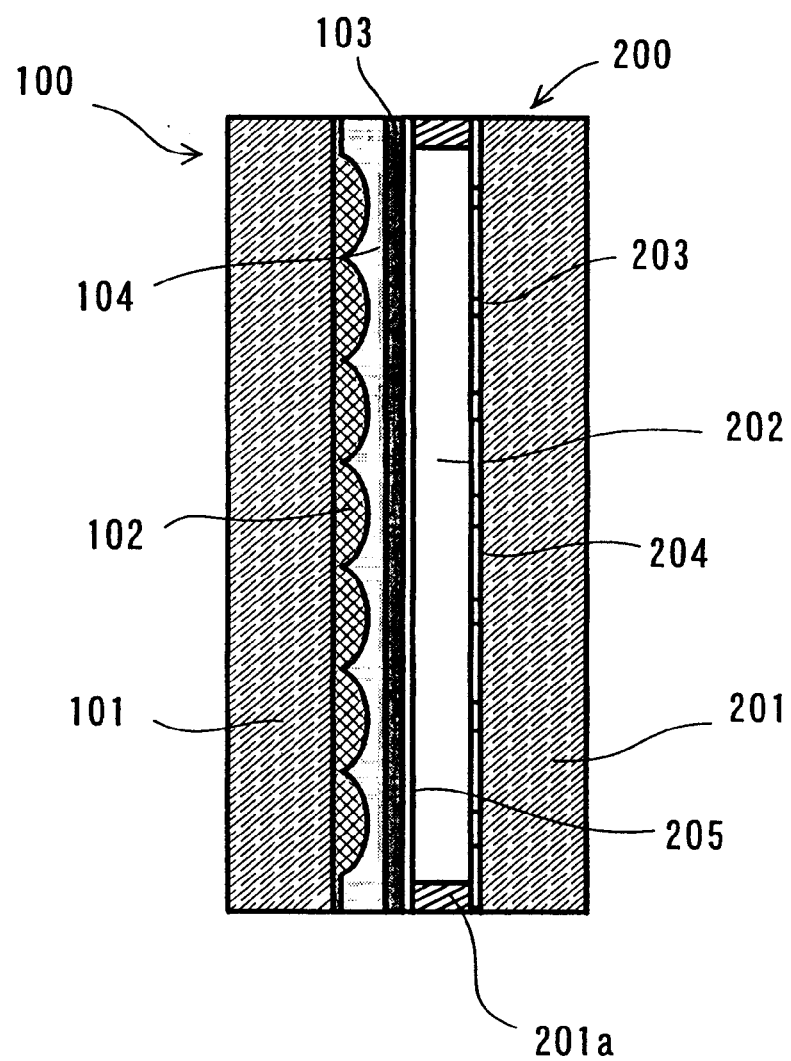
FIG. 1 is a cross-sectional view of a conventional liquid crystal display device.

Like or corresponding parts are denoted by like or corresponding reference characters throughout all views.

Figure 2:
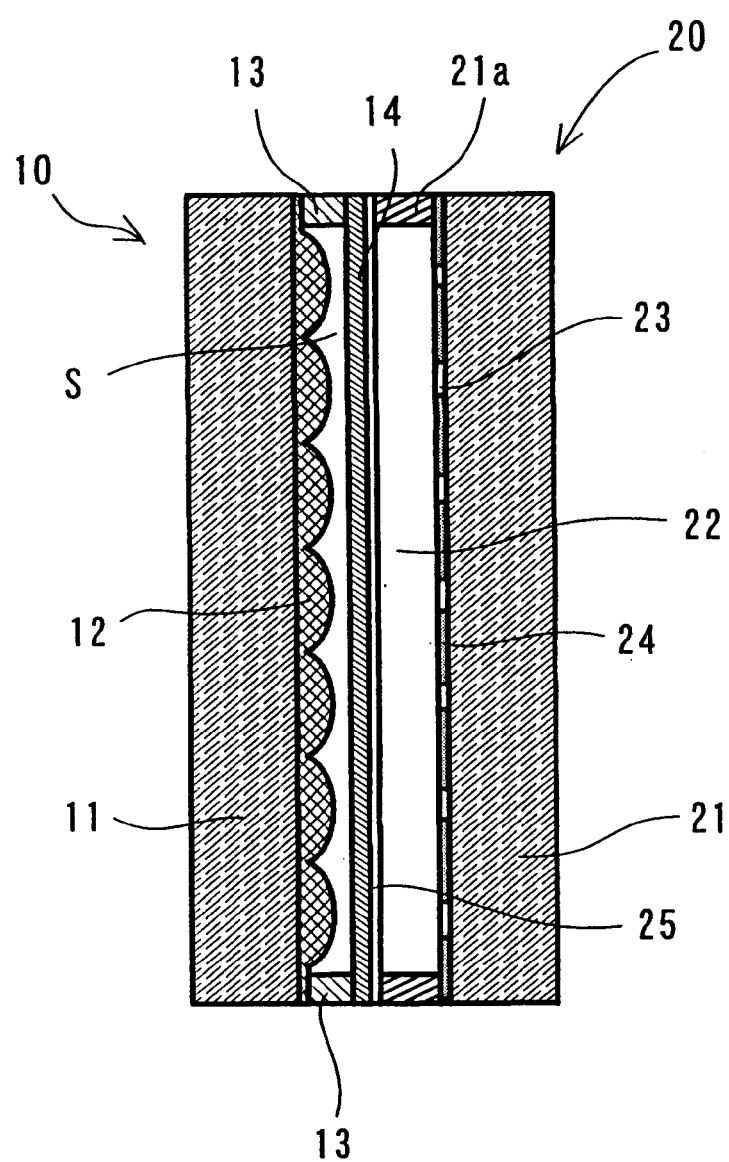
FIG. 2 is a cross-sectional view of a liquid crystal display device according to the present invention.

As shown in FIG. 2, a liquid crystal display device according to the present invention comprises a planar microlens array 10 and a liquid-crystal display panel 20 which are combined with each other. The planar microlens array 10 comprises an array of convex microlenses 12 mounted on a flat surface of a base glass plate 11. The convex microlenses 12 are made of an ultraviolet-curable synthetic resin having a relatively high refractive index ranging from 1.58 to 1.63. The planar microlens array 10 also has a cover glass plate 14 whose peripheral edge is hermetically bonded by a sealing member 13 to the peripheral edge of the array of convex microlenses 12 on the base glass plate 11. The cover glass plate 14 has a refractive index ranging from 1.45 to 1.53. The sealing member 13 may be made of an ultraviolet-curable synthetic resin, for example.

The cover glass plate 14 is spaced from the convex microlenses 12 by the sealing member 13, providing a hermetically sealed space S which is surrounded by the convex microlenses 12, the cover glass plate 14, and the sealing member. If the space S were filled with air, the surfaces of the convex microlenses 12 would undesirably be oxidized and discolored. To prevent the convex microlenses 12 from being unduly oxidized and discolored, therefore, the space S is filled with an inactive gas such as dry nitrogen gas, argon gas, or the like.

Figure 3:
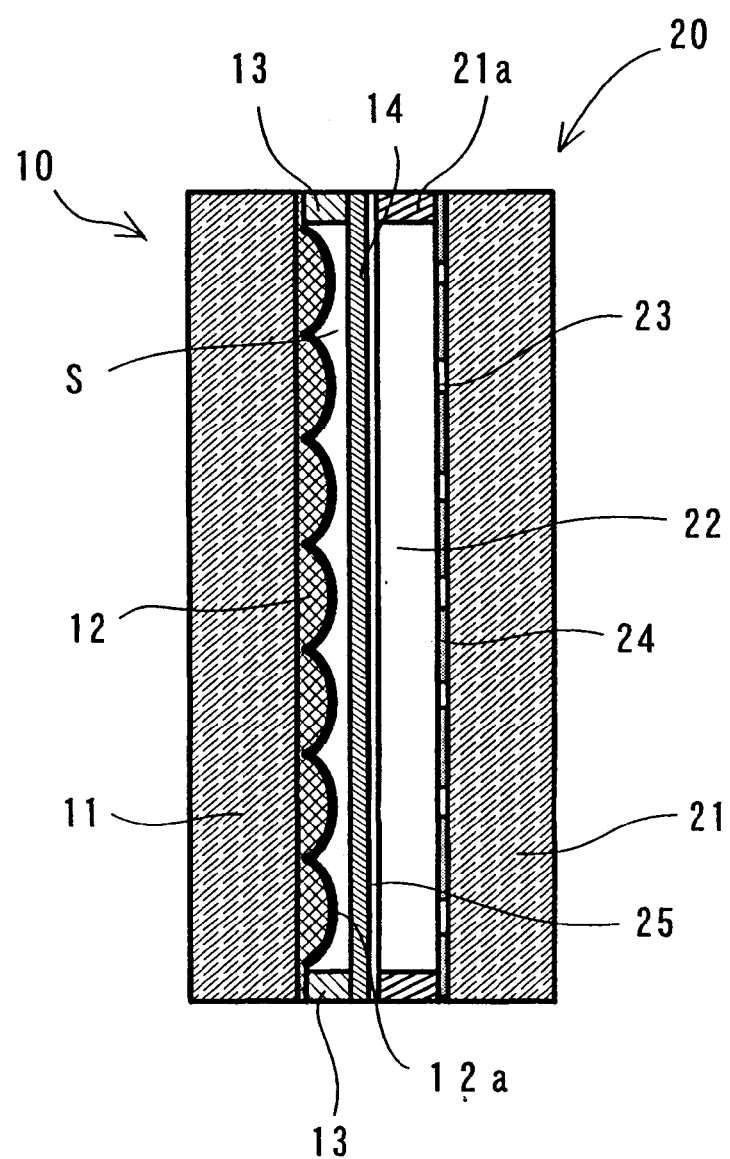
FIG. 3 is a cross-sectional view of a modified liquid crystal display device according to the present invention.

FIG. 3 shows a modified liquid crystal display device according to the present invention. In the modified liquid crystal display device shown in FIG. 3, the space S is not filled with any inactive gas, and the surfaces of the convex microlenses 12 are coated with an anti-oxidation film 12a. The anti-oxidation film 12a may comprise a single-layer film of silica or titanium dioxide or a multiple-layer film of silica and titanium dioxide, for example. These materials may appropriately be selected to make the anti-oxidation film 12a serve also as an anti-reflection film.

Alternatively, the space S may be filled with an inactive gas, and the surfaces of the convex microlenses 12 may be coated with the anti-oxidation film 12a.

As shown in FIG. 2, the liquid-crystal display panel 20 has a glass substrate 21 spaced from the cover glass plate 14 by a spacer 21a, with a liquid crystal layer 22 filled between the cover glass plate 13 and the glass substrate 21. The glass substrate 21 supports transparent pixel electrodes 23 on its surface facing the liquid crystal layer 22. The surface of the glass substrate 21 includes areas that are free of the transparent pixel electrodes 23 and that carry interconnections and TFTs (Thin Film Transistors) which do not transmit incident light. Electrodes 25 which confront the transparent pixel electrodes 23 across the liquid crystal layer 22 are mounted on a surface of the cover glass plate 14 that faces the liquid crystal layer 22.

Figure 4:
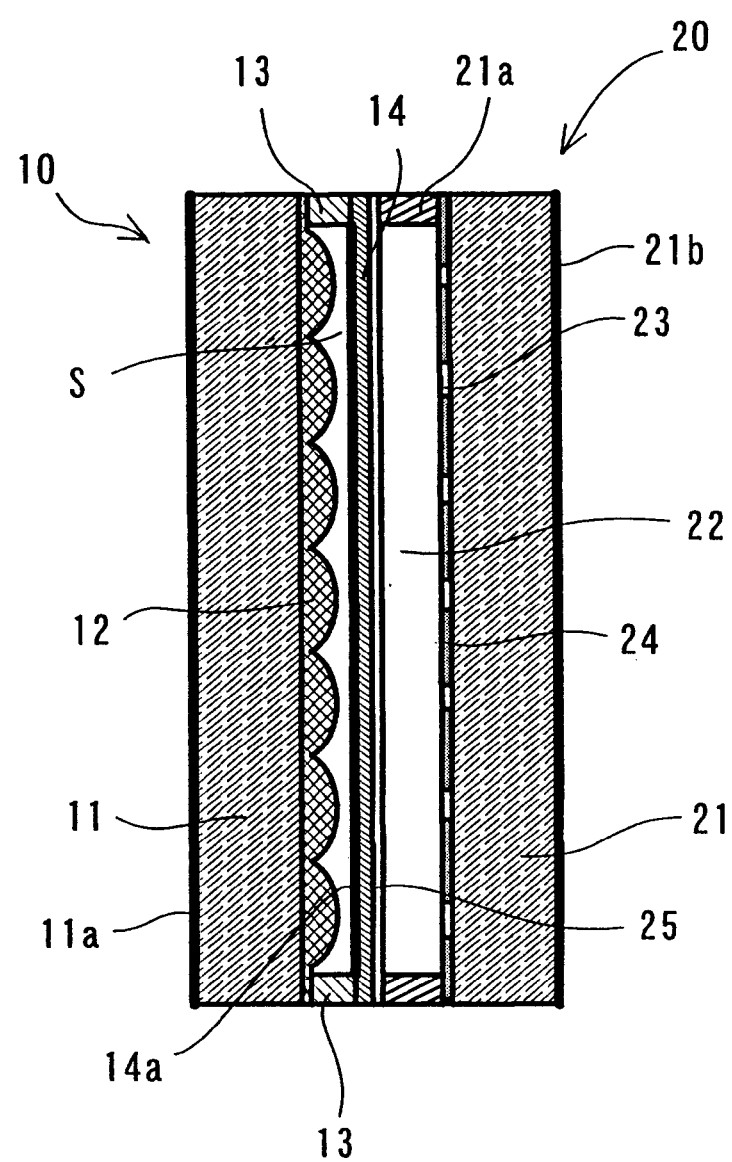
FIG. 4 is a cross-sectional view of another modified liquid crystal display device according to the present invention.

FIG. 4 shows another modified liquid crystal display device according to the present invention. In the modified liquid crystal display device shown in FIG. 4, the surface of the base glass plate 11 facing away from the array of convex microlenses 12 is coated with an anti-oxidation film 11a, the surface of the cover glass plate 14 facing the array of convex microlenses 12 across the hermetically sealed space S is coated with an anti-oxidation film 14a, and the surface of the glass substrate 21 facing away from the liquid crystal layer 22 is coated with an anti-oxidation film 21b. All or at least one of these anti-oxidation films 11a, 14a, 21b may be coated.

A process of manufacturing the liquid crystal display device shown in FIG. 2 will be described below with reference to FIG. 5.

First, an uncured ultraviolet-curable synthetic resin having a relatively high refractive index is coated on a surface of the base glass plate 11, and then shaped into the array of convex microlenses 12 by a stamper (not shown). Thereafter, another uncured ultraviolet-curable synthetic resin is coated as the sealing member 13 on the peripheral edge of the array of convex microlenses 12. The cover glass plate 14 with the electrodes 25 mounted thereon is pressed against the sealing member 13, as shown in FIG. 4. Then, the entire assembly is exposed to ultraviolet radiation to cure the array of convex microlenses 12 and the sealing member 13 simultaneously, thus fabricating the planar microlens array 10.

Thereafter, the glass substrate 21 with the transparent pixel electrodes 23 and the spacer 21a supported thereon is combined with the planar microlens array 10. When the glass substrate 21 and the planar microlens array 10 are combined with each other, the glass substrate 21 is spaced from the cover glass plate 14 by the spacer 21a. The space between the glass substrate 21 and the cover glass plate 14 is then filled with the liquid crystal layer 22, thus completing the liquid-crystal display device.

Figure 6:
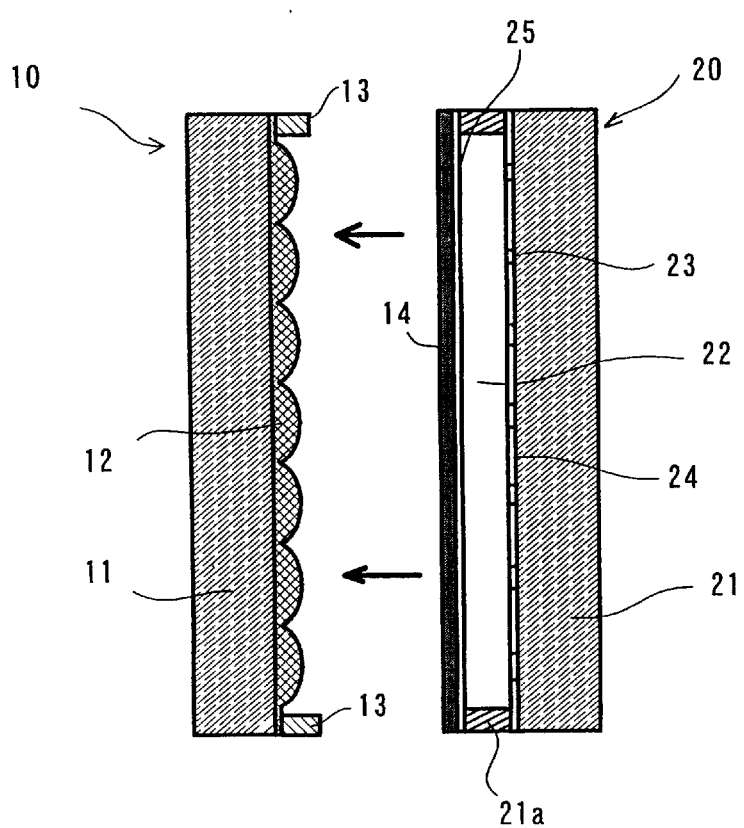
FIG. 6 is an exploded cross-sectional views illustrative of another process of manufacturing the liquid crystal display device according to the present invention.

Another process of manufacturing the liquid crystal display device shown in FIG. 2 will be described below with reference to FIG. 6.

Figure 5:
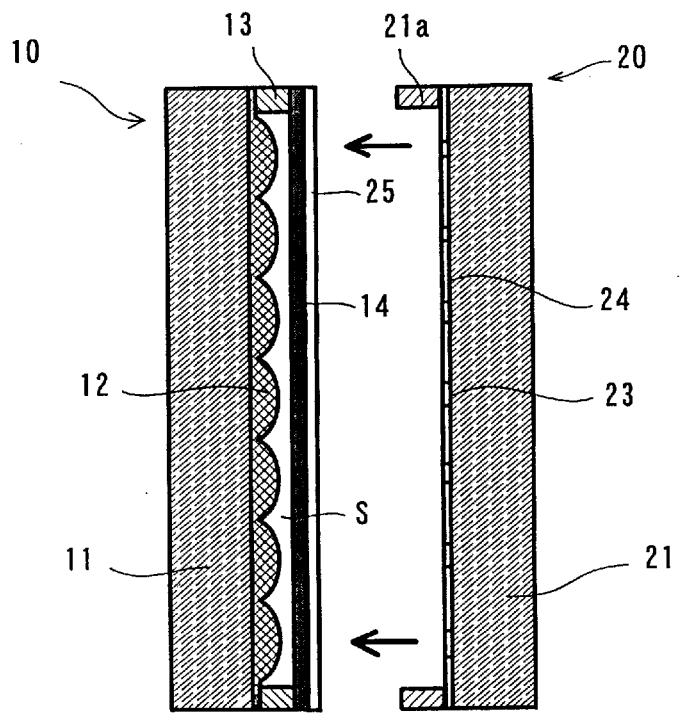
FIG. 5 shows exploded cross-sectional views illustrative of a process of manufacturing the liquid crystal display device according to the present invention.

The glass substrate 21 with the transparent pixel electrodes 23 and the spacer 21a supported thereon, and the cover glass plate 14 with the electrodes 25 mounted thereon are combined with each other, and the space between the glass substrate 21 and the cover glass plate 14 is then filled with the liquid crystal layer 22, as shown in FIG. 5.

An uncured ultraviolet-curable synthetic resin having a relatively high refractive index is coated on a surface of the base glass plate 11, and then shaped into the array of convex microlenses 12 by a stamper (not shown). Thereafter, another uncured ultraviolet-curable synthetic resin is coated as the sealing member 13 on the peripheral edge of the array of convex microlenses 12. The cover glass plate 14 already mounted on the glass substrate 21 is pressed against the sealing member 13. Then, the entire assembly is exposed to ultraviolet radiation to cure the array of convex microlenses 12 and the sealing member 13 simultaneously, thus completing the liquid-crystal display device.

The manufacturing processes shown in FIGS. 4 and 5 differ from each other in that according to the process shown in FIG. 4, the cover glass plate 14 with the electrodes 25 mounted thereon has already been joined to the planar microlens array 10 when the glass substrate 21 is connected to the cover glass plate 14, whereas according to the process shown in FIG. 5, the cover glass plate 14 with the electrodes 25 mounted thereon has already been joined to the glass substrate 21 when the cover glass plate 14 is connected to the base glass plate 11. The difference between the manufacturing processes shown in FIGS. 4 and 5 is not essential, and the liquid-crystal display device may be manufactured according to either the manufacturing process shown in FIG. 4 or the manufacturing process shown in FIG. 5 depending on practical considerations regarding the actual fabrication facility that is used to manufacture the liquid-crystal display device.

In each of the liquid-crystal display devices shown in FIGS. 2 and 3, the hermetically sealed space S present between the array of convex microlenses 12 and the cover glass plate 14 is effective to provide a greater refractive index difference with respect to the material of the array of convex microlenses 12 than with respect to the adhesive layer which has conventionally been held in contact with the array of convex microlenses to bond the cover glass plate to the array of convex microlenses. Accordingly, the array of convex microlenses 12 has a relatively large numerical aperture and hence a relatively small spherical aberration.

Furthermore, since the hermetically sealed space S is filled with an inactive gas and/or the surfaces of the convex microlenses 12 are coated with the anti-oxidation film 12a, the convex microlenses 12 are effectively prevented from being unduly oxidized and discolored.

Although certain preferred embodiments of the present invention have been shown and described in detail, it should be understood that various changes and modifications may be made thereto without departing from the scope of the appended claims.

What is claimed is:

1. A liquid-crystal display device comprising:
   a planar microlens array; and a liquid-crystal display panel coupled with said planar microlens array, wherein said planar microlens array comprises:
   a base glass plate;
   an array of convex microlenses mounted on a surface of said base glass plate; and
   a cover glass plate joined to said liquid-crystal display panel having a peripheral edge bonded to a peripheral edge of said array of convex microlenses, said cover glass plate being spaced from said array of convex microlenses by a hermetically sealed space.

2. A liquid-crystal display device according to claim 1, wherein said hermetically sealed space is filled with an inactive gas.

3. A liquid-crystal display device according to claim 2, wherein said inactive gas comprises dry nitrogen gas.

4. A liquid-crystal display device according to claim 2, wherein said inactive gas comprises argon gas.

5. A liquid-crystal display device according to claim 1 or 2, wherein said array of convex microlenses is made of a synthetic resin and is coated with an anti-oxidation film.

6. A liquid-crystal display device according to claim 5, wherein said synthetic resin comprises an ultraviolet-curable synthetic resin.

7. A liquid-crystal display device according to claim 5, wherein said anti-oxidation film doubles as an anti-reflection film.

8. A liquid-crystal display device according to claim 7, wherein said anti-oxidation film comprises a single-layer film of silica.

9. A liquid-crystal display device according to claim 7, wherein said anti-oxidation film comprises a single-layer film of titanium dioxide.

10. A liquid-crystal display device according to claim 7, wherein said anti-oxidation film comprises a multiple-layer film of silica and titanium dioxide.

11. A liquid-crystal display device according to claim 5, wherein said cover glass plate has a surface facing said array of convex microlenses across said hermetically sealed space and is coated with an anti-oxidation film.

12. A liquid-crystal display device according to claim 5, wherein said base glass plate has a surface facing away from said array of convex microlenses and is coated with an anti-oxidation film.

13. A liquid-crystal display device according to claim 5, wherein said liquid-crystal display panel comprises:
   a glass substrate spaced from said cover glass plate; and
   a liquid crystal layer filled between said glass substrate and said cover glass plate;
   said glass substrate having a surface facing away from said liquid crystal layer and coated with an anti-oxidation film.

* * * * *